Sept. 15, 1959  R. L. CARLSTEDT  2,903,917
STEADY REST STRUCTURE
Filed April 17, 1957  6 Sheets-Sheet 1
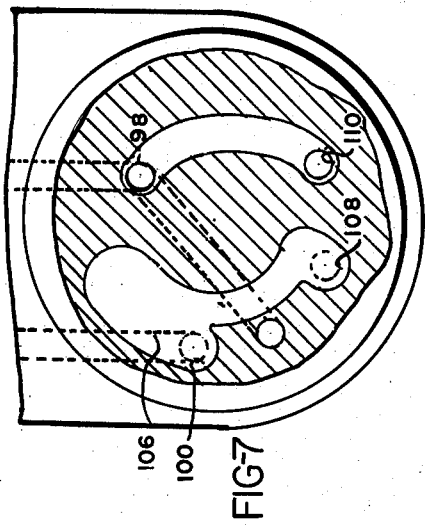
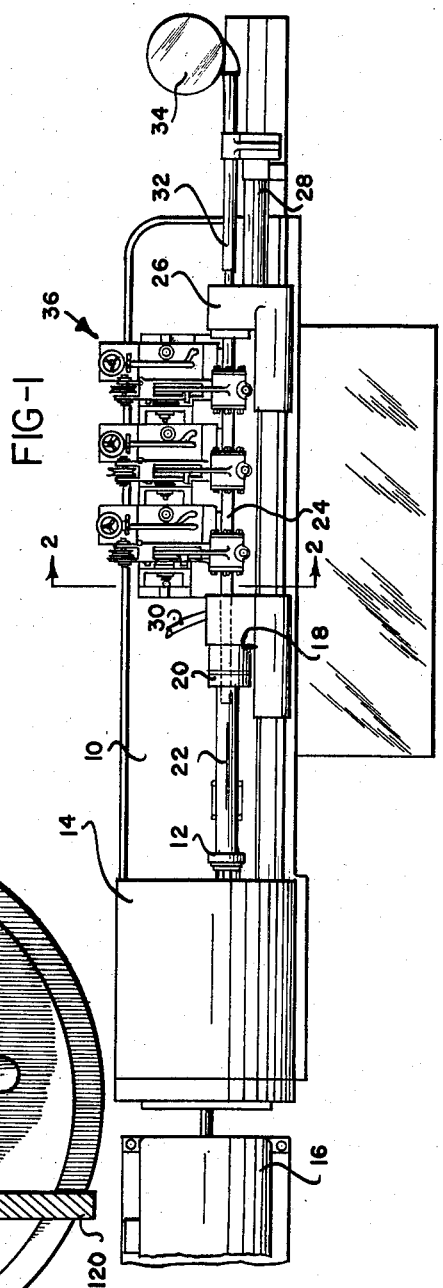
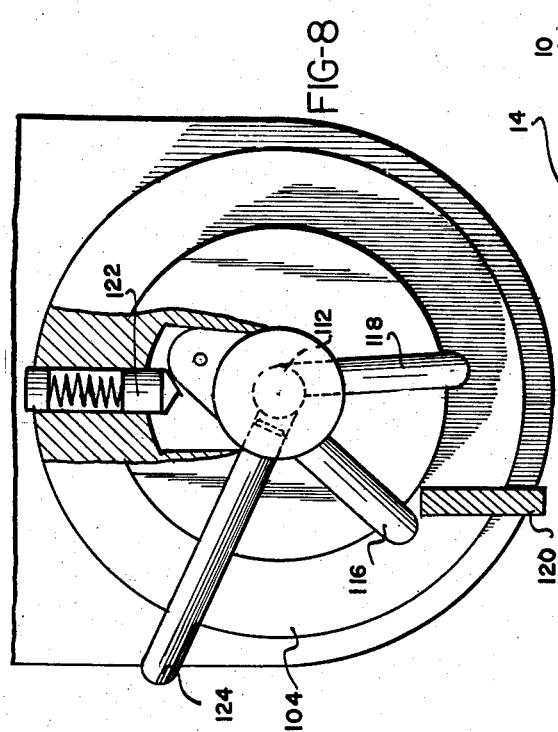
INVENTOR.
RAGNAR L. CARLSTEDT
BY
ATTORNEYS

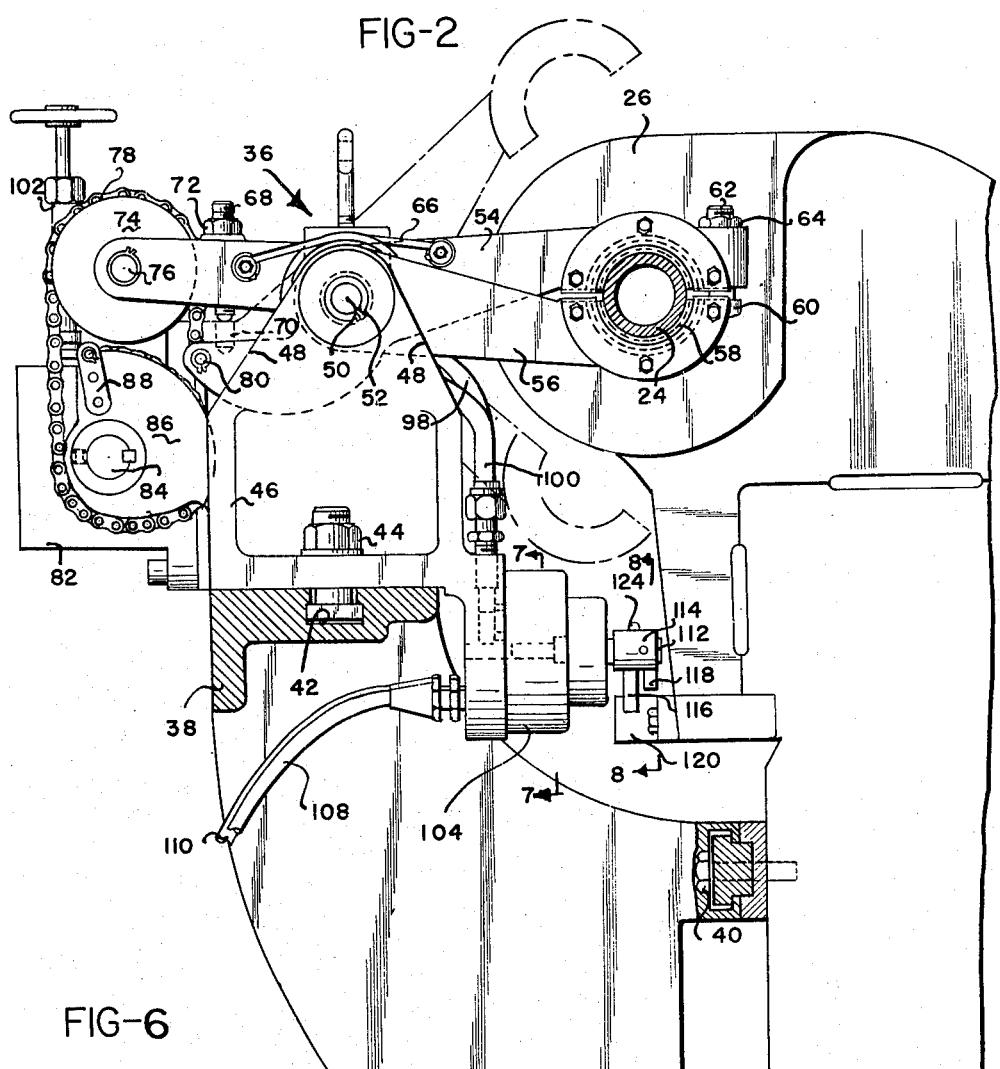

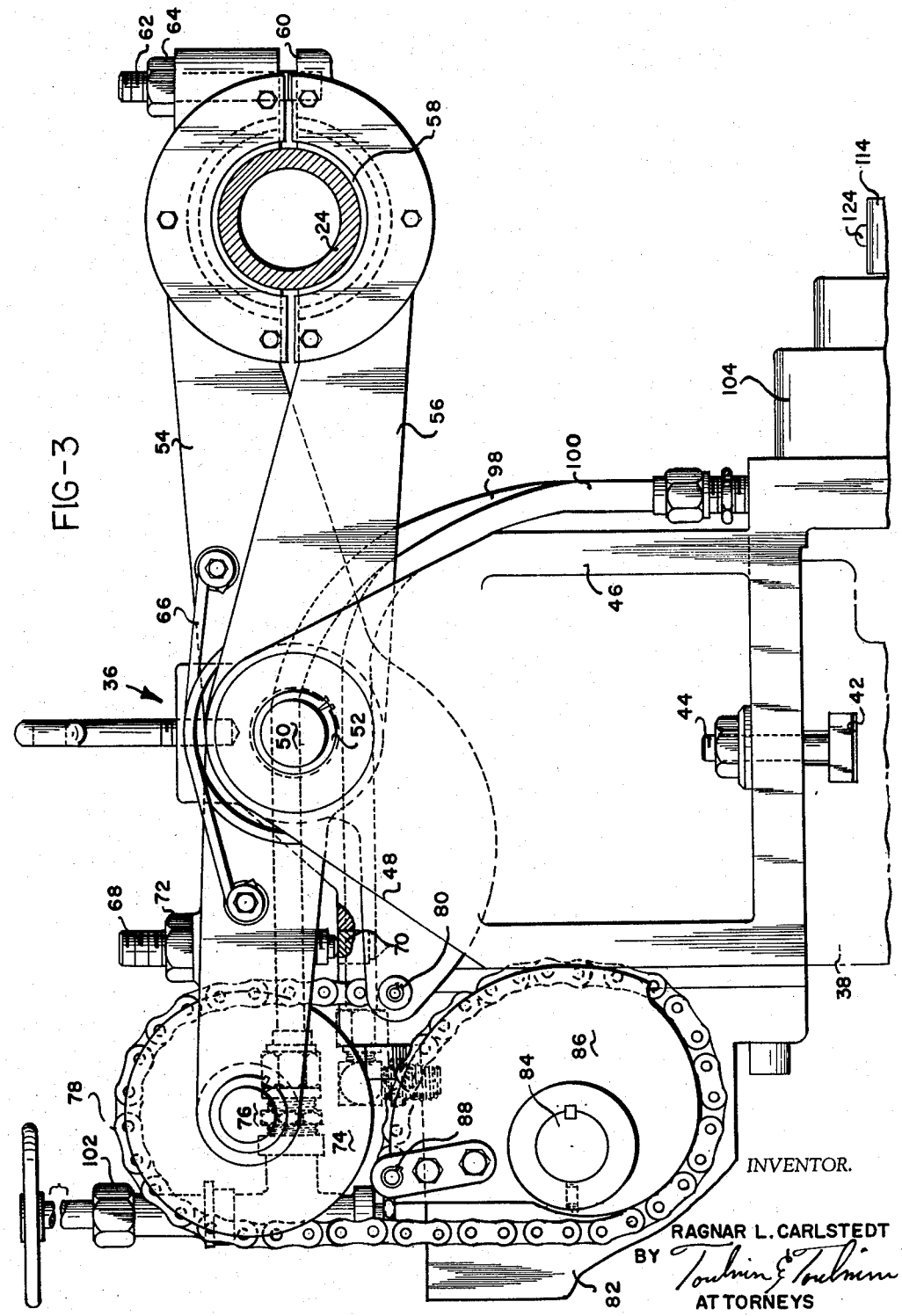

Sept. 15, 1959　　　R. L. CARLSTEDT　　　2,903,917
STEADY REST STRUCTURE
Filed April 17, 1957　　　　　　　　　　　6 Sheets-Sheet 4

INVENTOR.
RAGNAR L. CARLSTEDT
BY
ATTORNEYS

Sept. 15, 1959  R. L. CARLSTEDT  2,903,917
STEADY REST STRUCTURE

Filed April 17, 1957  6 Sheets-Sheet 5

INVENTOR.
RAGNAR L. CARLSTEDT
BY Toulmin & Toulmin
ATTORNEYS

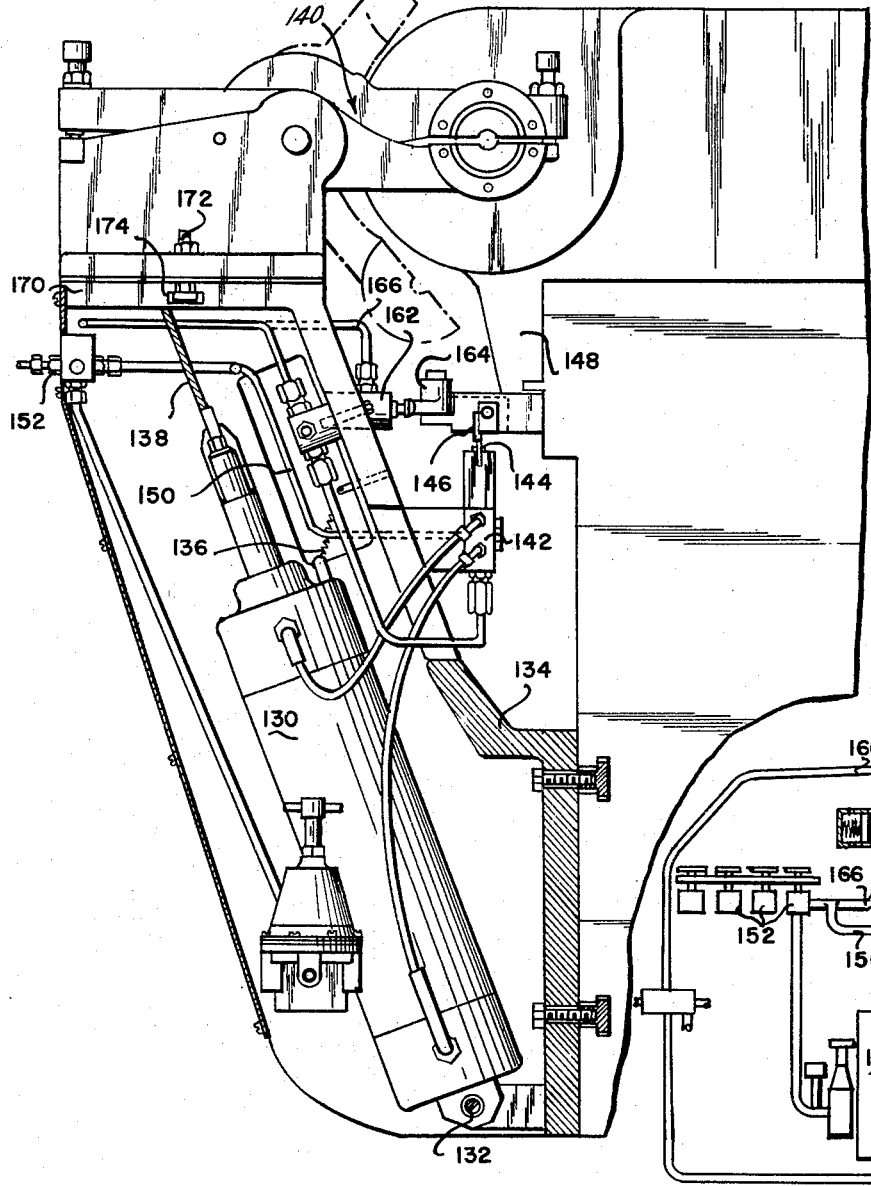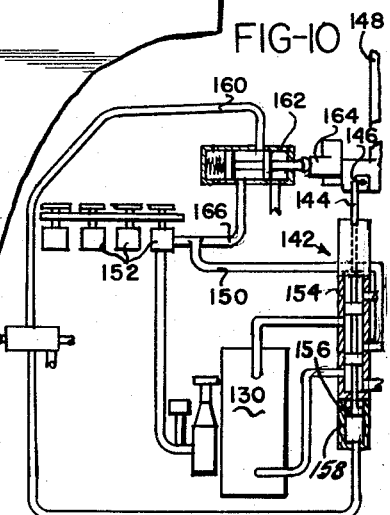

United States Patent Office 2,903,917
Patented Sept. 15, 1959

2,903,917

STEADY REST STRUCTURE

Ragnar L. Carlstedt, Cincinnati, Ohio, assignor to The R. K. Le Blond Machine Tool Co., Cincinnati, Ohio, a corporation of Delaware Application April 17, 1957, Serial No. 653,361

6 Claims. (Cl. 77—3)

This invention relates to boring machines, particularly to deep hole boring machines, and more particularly still to boring machines of the type wherein the workpiece rotates and a non-rotating boring bar is positioned against the end of the workpiece to accomplish the cutting action. Still more in detail, the present invention is concerned with an arrangement for holding the boring bar of a boring machine of this nature.

Boring machines of the nature referred to are employed for boring out members such as axles or gun barrels or the like and many times the hole to be bored is quite deep. Economy dictates that a work operation of this nature must be carried out rapidly and for this reason the boring bar is thrust against the end of the workpiece with considerable pressure in order to obtain a fast cutting action. Since the boring bar is relatively slender it will be apparent that the placing of the bar under relatively high compression may tend to cause it to buckle or bend and this tendency is further augmented by vibrations set up in the bar by the machining operation.

Having the foregoing in mind, the primary object of the present invention is the provision of an arrangement for supporting an elongated relatively slender boring bar such as referred to against lateral deflection during a boring operation.

A still further object of this invention is the provision of support elements for engaging an elongated boring bar between the driving motor therefor and the workpiece which it bores for supporting the boring bar at a plurality of points against lateral deflection.

A still further object of this invention is the provision of an arrangement for providing a plurality of spaced points of support for a boring bar which is to be moved axially into a workpiece and in connection with which the said spaced points of support are adjustable lengthwise of the boring bar to provide for the most desirable operating conditions.

A still further object of the present invention is the provision of a supporting arrangement for an elongated axially movable boring bar in which the supporting means is stationary and is operable for releasing the boring bar as the member on which the boring bar is mounted moves into the region of the supporting device.

It is also an object of this invention to provide a boring bar supporting device or steady rest structure consisting of a plurality of pairs of separable clamp jaws in which a relatively simple operating mechanism is provided for opening and closing the said jaws.

It is also an object of the present invention to provide an attachment for a boring machine in which the attachment can be detachably mounted on existing machines or provided as an auxiliary for new manufacture and which will embody the objects referred to above.

It is also a still further object of this invention to provide a plurality of steady rest structures in spaced relation between a work member and the driving means for a boring bar operating the work member together with control means operable for successively disengaging the steady rests as the boring of the workpiece proceeds whereby the steady rest structure does not impede the progress of the boring bar driving means.

These and other objects and advantages will become more apparent upon reference to the accompanying drawings in which:

Figure 1 is a plan view of a boring machine having a steady rest arrangement associated therewith constructed according to this invention;

Figure 2 is a cross-sectional view through the machine indicated by line 2—2 on Figure 1 showing in somewhat large scale the steady rest structure and the frame on which it is mounted and the manner in which the frame is detachably secured to the frame of the boring bar;

Figure 3 is a view similar to Figure 2 but drawn at still larger scale for more clearly showing the parts of the steady rest structure;

Figure 6 is a diagrammatic view drawn through the actuating motor for a steady rest and may be indicated generally as being taken on line 6—6 of Figure 5;

Figure 7 is a diagrammatic illustration of the control valve that controls the supply of fluid to the actuating motor of Figure 6 and may be indicated as being taken on line 7—7 of Figure 2;

Figure 8 is a view indicated by line 8—8 on Figure 2 and showing the actuating lever arrangement for the control valve and the detent mechanism pertaining thereto;

Figure 4:
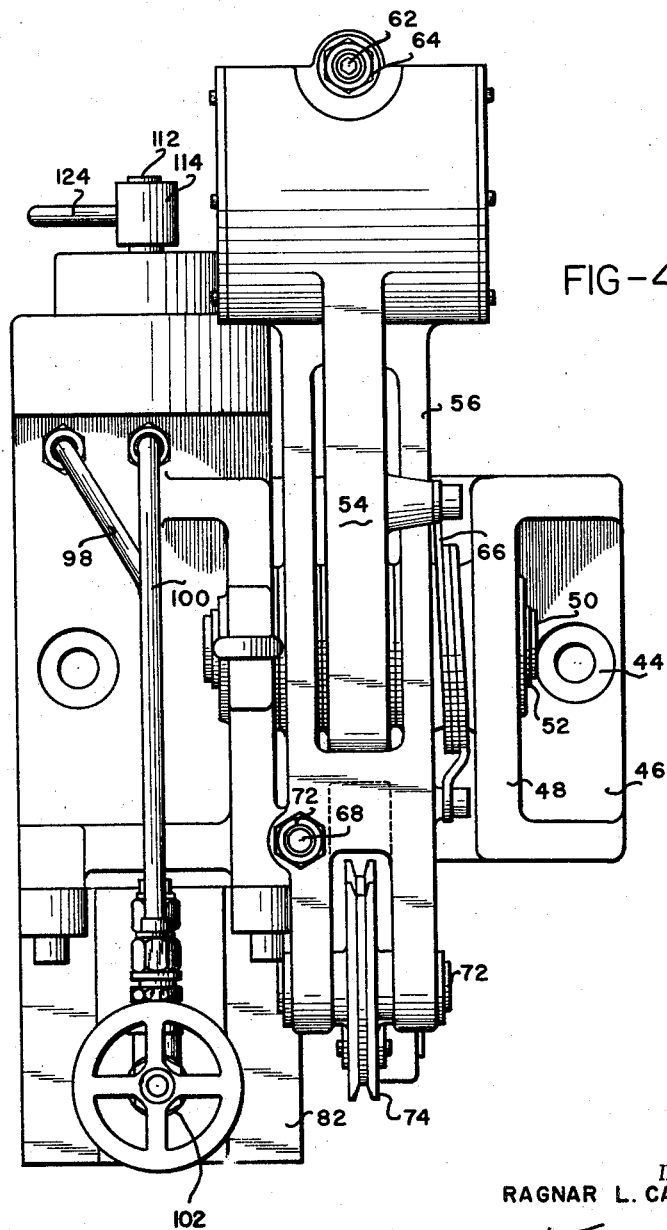
Figure 4 is a plan view looking down on top of the steady rest structure illustrated in Figure 3.
Figure 5:
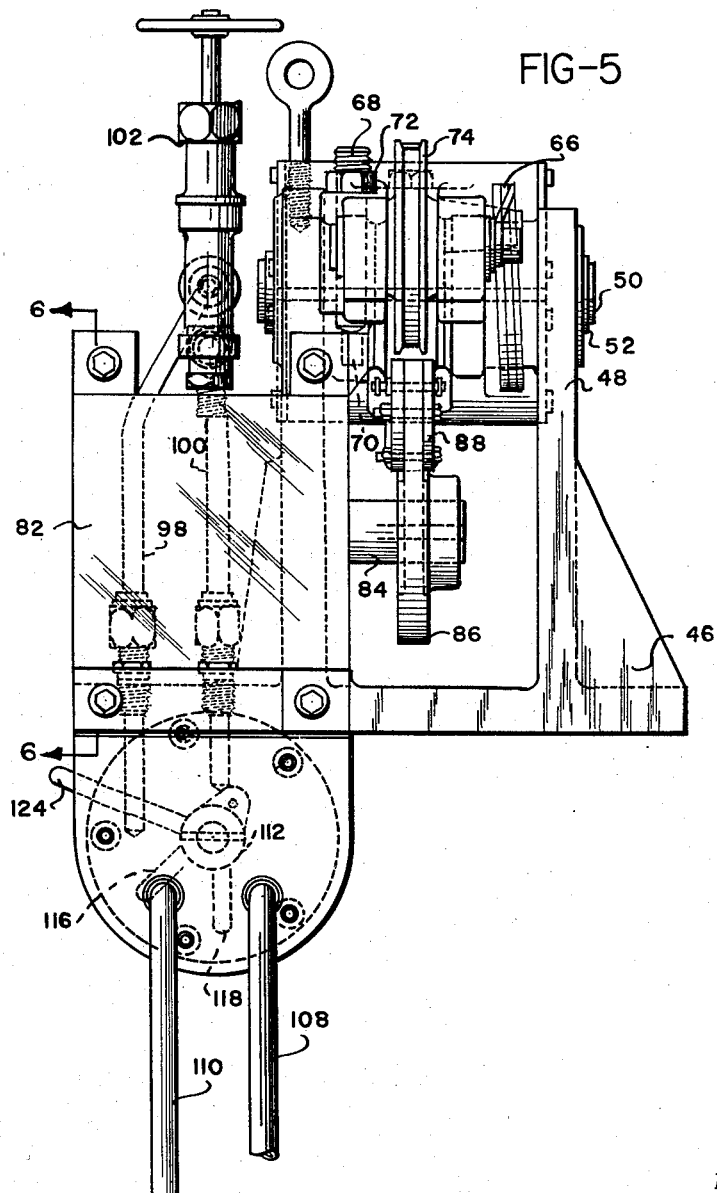
Figure 5 is a view looking in from the left side of the Figure 3 arrangement showing the steady rest structure from the back.

Figure 9 is a more or less diagrammatic showing of a modified arrangement of the steady rest structure in which reciprocating fluid motors are employed for the steady rest units instead of rotary fluid motors and wherein a single control valve can be employed for bringing about the closing of all of the steady rest structures at one time; and Figure 10 is a diagrammatic view showing the hydraulic circuit pertaining to the Figure 9 modification.

Referring to the drawings somewhat more in detail, the boring machine with which the steady rest structure of the present invention is adapted for being associated may comprise a frame 10 having at one end a rotary spindle 12 supported within an end frame part 14 and adapted for being driven by an electrical motor 16 as by belts or the like not shown in the drawings.

The machine frame 10 forms a bed upon which is slidably mounted a workpiece clamp 18 that has a rotary clamp portion 20 supported thereon so that a workpiece 22 can be clamped against the spindle by moving the clamp slide 18 toward the spindle by a suitable motor structure also not shown in the drawings.

The clamp slide 18 has a bore therethrough and extending though this bore is a boring bar 24 that is non-rotatably supported at its end opposite the workpiece in a boring slide 26 also movable along the bed of the machine as by the motor 28.

There is a supply of coolant under pressure through the clamp 18 as by conduit 30 which passes through the clamp and into the bore being made in workpiece 22 and then outwardly through the hollow boring bar 24 and a telescoping conduit arrangement 32 through a cyclone device 34 wherein the velocity of the oil is reduced so that it can be delivered to a settling chamber and then passed through a filter and returned to the cooling system.

The length of the boring bar 24 between the boring slide 26 and clamp 18 that is unsupported is substantial and this portion of the boring bar will tend to deflect or vibrate when the machine is in operation, particularly when the boring bar is placed under a high axial compression in order to accomplish rapid boring operations.

According to the present invention there is provided between boring slide 26 and clamp slide 18 a plurality of individual steady rest units 36 and each of which comprises a pair of arms pivoted together and having bearing means at their one end forming cooperating jaws to engage the boring bar. When the steady rest structures are closed about the boring bar it is held against bending and vibrations but is still free to slide axially through the clamping jaws or arms of the steady rest structures.

In order to permit the clamp slide 26 to approach as close to the back of clamp slide 18 as necessary in order to accomplish the complete boring operation, the individual steady rest structures are adapted for opening as the clamp side approaches them whereby the portion of the boring bar between the clamp slide and boring slide is always supported by the boring slide and is free to move throughout its full travel.

The steady rest units 36 are supported on a frame 38 adapted for detachable connection with the frame 10 of the boring machine as by the bolts 40. Member 38 comprises a horizontal platform portion having a T-slot 42 therein and each steady rest unit is clamped to the horizontal portion by the bolts 44. The arrangement is such that the steady rest units can be moved longitudinally of member 38 so as to be arranged in any desired position therealong and they can be arranged close together where considerable support is required for a very long slender boring bar or they can be spaced apart for a boring bar which is thicker and requires less support. In any case the feature of longitudinal adjustability of the individual steady rest structures is of merit in permitting the machine to be adapted to various jobs and also in permitting the steady rest structures readily to be detached from the machine for servicing or replacement when necessary.

Each individual steady rest unit consists of a base portion 46 which receives the aforementioned bolts 44 in flanges at the bottom thereof and which base portion comprises a pair of spaced upstanding parts 48 through which there extends a pivot shaft 50 which may be retained in position as by snap rings 52 engaging the shaft at the outside faces of the portions 48.

The shaft 50 is availed of for forming a pivot axis for the steady rest arms or jaws, the uppermost one of which is indicated at 54 while the lowermost one of which is indicated at 56. As will be seen in Figure 4 the lower arm portion 56 has a central opening therein through which the upper arm portion extends and the two arm portions together consist of a solid mass of metal between the upstanding portions 48 whereby the arm portions are prevented from shifting longitudinally of the supporting shaft 50.

The outer ends of arm portions are formed to provide jaw elements or half bearings so as to embrace the boring bar 24 as will be seen in Figure 3. The actual engagement of the arms with the boring bar may be by way of babbitt or similar bearing metal inserts 58 whereby a low friction engagement of the boring bar is had and which will permit ready axial movement of the boring bar therethrough.

The lower arm 56 carries a finished stop button 60 adapted for engagement by the lower finished end of an adjustable stop screw 62 carried by the upper arm and clamped in position therein by clamp nut 64. The arrangement is such that the boring elements can be caused to engage the boring bar with just the proper degree of pressure to hold the boring bar while still permitting axial movement thereof.

The arms 54 and 56 are normally urged toward an open position by a torsion spring 66 connected therebetween as will be seen in Figures 3 and 4. When the arms are released they will spring open and release the boring bar and they will open to the position indicated by the dot-dash outline in Figure 2 so that the boring slide 26 can pass between the arms without striking them.

In addition to determining the relative position between the two arms by the stop button 60 and stop screw 62, the precise position of the two arms together is determined by a still further stop screw 68 mounted in the lower arm on the side of the pivot shaft 50 opposite boring bar 24 and adapted for engagement with a hardened stop button 70 mounted in frame part 46. Stop screw 68 is adapted for being locked fixedly in place in arm 56 by nut 72. It will be evident that the two stop screws and their pertaining abutments precisely fix the positions of the two arms when closed and thus precisely predetermine the conditions of engagement of the jaw ends of the arms with the boring bar 24.

The end of arm 56 in which stop screw 68 is mounted also carries a pulley or roller 74 on a shaft 76. Passing over pulley or roller 74 is a chain 78 and one end thereof is connected at 80 to the end of arm 54 at a point directly beneath the periphery of pulley or roller 74. It will be evident at this point that a downward pull on the chain 78 to the left side of pulley 74 as it is viewed in Figure 3 will simultaneously urge the left end of arm 56 downwardly and the left end of arm 54 upwardly thus causing the closing together of the right ends of the arm about the boring bar with the final positions of the arms being predetermined by the aforementioned combination of abutments and stop screws.

For obtaining the aforementioned pull on the chain or cable, there is provided a rotary fluid motor 82 having an output shaft 84 on which is mounted a spiral element 86 about which chain 78 passes and to which the said chain is attached as by the grip means 88. It will be apparent that the member 86 is so constructed that for a given torque imposed on shaft 84, the greatest speed of motion of arms 54 and 56 will occur when the arms first commence to close whereas the greatest force urging the arms toward their closed position will be had when the arms are completely closed.

The rotary fluid motor, preferably pneumatically operated is of conventional type and is more or less diagrammatically illustrated in Figure 6 wherein it will be seen to comprise a rotor 90 that is connected with shaft 84 and which rotor is located in a cavity 92 having an abutment 94 engaging the rotor. A vane 96 carried by the rotor divides the cavity into two parts. Conduits 98 and 100 lead into opposite ends of the cavity divided by vane 96 whereby it will be evident that a supply of pressure to conduit 98 will urge rotor 90 counter clockwise as it is viewed in Figure 6 whereas a supply of pressure fluid to conduit 100 will urge the rotor in the opposite direction.

The conduit 100 is the one through which pressure fluid is supplied for closing the arms about the boring bar. This conduit may advantageously have a needle valve 102 located therein in order to control the rate at which the arms open and close thereby to prevent any shock to the mechanical parts during the operation of the steady rest units.

The conduits 98 and 100 lead to a valve structure 104 carried by a depending portion of the frame part 46 and which valve structure is diagrammatically illustrated in Figure 7. In Figure 7 it will be noted that the valve structure comprises a rotor 106 adapted in its shifted positions to connect pressure conduit 108 with one or the other of the conduits 98 and 100 while simultaneously connecting the other thereof with exhaust conduit 110.

The aforementioned connections are accomplished by shifting of the valve rotor 106 through an angle of somewhat less than 90° and this is accomplished by the shifting mechanism carried on the shaft 112 attached to the valve rotor and projecting toward the frame of the machine. As will be seen in Figures 2 and 4 the shaft 112 has mounted thereon a collar 114 from which extend in angular relation the actuating pins 116 and 118. For engaging the pins in order to turn the valve between its two positions, the boring slide 26 is provided with a cam element 120 which will engage pin 116 in one direction of movement of the boring slide and pin 118 in the other direction of movement thereof so that as the boring slide moves forwardly the steady rests are successively opened and as the boring slide retracts the steady rests are successively closed.

As will be seen in Figure 8, the valve is provided with a snap-over mechanism 122 that snaps the valve rotor into the position toward which it is being shifted once it has passed center.

Inasmuch as there will be occasion for removal of the boring bar, means are preferably provided for opening all of the steady rests at one time with the boring slide retracted. In the described arrangement, this is quite readily accomplished by providing each collar 114 with an additional actuating lever 124 to permit manual actuation of the valve into the position in which the steady rest arms will open. After the boring bar has been released or adjusted, the valve can again be actuated by the levers 124 to close the steady rest and normal operation can thereafter be resumed.

The chain 78 above described is the preferred actuating element to employ for transmitting the power from the rotary fluid motor to the steady rest arms, but it will be evident that this element instead could be of any flexible device of suitable strength such as a flat band or a cable. The essential thing in connection with this element is that it be flexible and inextensible and have substantial strength.

A still further arrangement that can be made of the steady rests is illustrated in Figure 9 wherein reciprocating fluid motors 130 are employed and which motors are pivoted at 132 at their lower ends to bracket means provided in the frame 134 that is attached to the frame of the machine. The upper ends of the fluid motors may be resiliently supported as by the springs 136 and the rams of the motors are connected by flexible inextensible actuating element 138 with all of steady rest arms generally indicated at 140 and which may be substantially identical with the ones already described.

The actuating system for the fluid motors 130 is in the form of a valve 142 pertaining to each thereof having a valve member which has an upper position wherein the fluid motors are energized to close their pertaining steady rest arms whereas in the downward position of the said valves the motors pertaining thereto open their connected steady rest arms.

Each valve 142 has a roller or the like 144 adapted for actuation by an element 146 carried on the boring slide 148. Movement of the boring slide will thus cause successive actuation of the valves 142 and successive opening of the steady rest arms pertaining thereto into the dotted line positions indicated in Figure 9 thereby permitting the boring slide to pass the steady rest.

The operating circuit for the Figure 9 modification is illustrated in Figure 10 wherein it will be seen that there is a supply of pressure fluid, such as compressed air to the inlets of the several valves 142 via a supply conduit network 150 with each supply conduit having a needle valve 152 pertaining thereto to control the rate of supply of pressure fluid to the valve connected therewith.

Each valve 142 comprises a valve member 154 and the valve member is so arranged in the valve body that it will remain in whichever position it occupies whether it be up or down. The lower end of each valve member has a piston portion 156 extending into a cylinder 158 and connected with each cylinder 158 is conduit 160 leading to a valve 162 that normally connects conduit 160 with exhaust. Valve 162 is movable by cam element 164 attached to the boring slide 148 when in its fully retracted position.

The arrangement is such that when the boring slide reaches the fully retracted position cam 164 will actuate valve 162 to cause it to connect conduits 160 with a pressure conduit 166 whereupon all of valves 142 are thrust upwardly by the pressure fluid conducted to the cylinder 158 associated therewith and all of the steady rests will close. Thereafter as the boring slide advances, it first permits valve 162 to connect the conduits 160 with the exhaust, but, as mentioned before, the valve members 154 of valves 142 will stay in their upper positions until moved downwardly by cam 146.

It will be evident that the same sort of automatic operation of the steady rests occurs in the modification of Figure 9 as occurred in the first described modification and that all of the steady rests of the Figure 9 arrangement can be opened at one time by shifting cam 164 so that it will not engage valve 162 at the end of its retraction stroke. Optionally, the steady rests can be opened when the boring slide is retracted by moving cam 164 out of engagement with valve 162 and then manually shifting the valve members 154 downwardly.

The steady rest arrangement of Figure 9 could be arranged in the form of a plurality of individual units adapted for lengthwise adjustment within predetermined limits along the frame of the machine by mounting the units on the platform portion 170 by means of the bolts 172 extending into the T-slots 174 in the platform. In this manner the same advantages of adjustability of the steady rests along the same would be had as obtains in connection with the first described modification.

The first described modification is, of course, the more flexible of the two units described because in the first modification each steady rests unit is complete in itself and requires only the connection thereto of pressure and exhaust conduits in order to provide for an operative structure.

It will be understood that this invention is susceptible to modification in order to adapt it to different usages and conditions; and, accordingly, it is desired to comprehend such modifications within this invention as may fall within the scope of the appended claims.

I claim:

1. In a boring machine of the nature described having a frame with workpiece supporting means thereon and a boring slide slidable thereon and carrying a boring bar; a steady rest structure of integral structure comprising a supporting base portion adapted for detachable mounting on said frame, a pair of arms pivotally mounted on said base portion and having half bearings in their one end adapted for closing about the said boring bar in supporting relation thereto, a rotary fluid motor carried by said base portion connected with said arms for moving them into their closed position, a spring acting between said arms urging them toward their open position, a valve also carried by the supporting base portion and connected for reversibly supplying fluid to said motor, and a cam member carried by said slide adapted for actuating the valve during advancing movement of said slide to cause opening of said arms to permit the slide to pass therebetween, and for actuating said valve during the retracting movement of said slide to cause the arms to close when the slide is retracted past the arms, said valve also comprising means for manual actuation thereof to permit opening of the steady rest arms at any time to permit replacing of the boring bar.

2. In a boring machine having a frame and a boring slide movable thereon and carrying a boring bar, a steady rest structure of integral structure for supporting the boring bar against deflection laterally to its length while permitting axial movement thereof comprising a supporting base portion adapted for being detachably mounted on said frame, a pair of arms pivotally mounted in said supporting base portion and adapted for closing about the said boring bar in supporting relation thereto, spring means biasing said arms toward their open position, a rotary fluid motor carried by said base portion having an output shaft, a flexible drive element connected with said output shaft and connected with the end of one of said arms opposite the boring bar, the other of said arms having an idler pulley over which said element passes so that actuation of the motor in one direction will cause closing of said arms against said spring, and valve means also carried by said supporting base portion having means arranged for actuation of said slide during the advancing and retracting movements thereof for causing opening and closing respectively of said arms.

3. In a boring machine having a frame and a boring slide slidable along the frame and carrying a boring bar, steady rest means mounted on the frame for supporting the boring bar against lateral deflection, said steady rest means comprising a support frame mounted on the frame of the machine and having a platform portion thereon, a supporting base portion mounted on said platform, a pair of arms pivoted to said base portion adapted for closing about the boring bar in supporting relation thereto, spring means acting between the arms to urge them away from each other, an idler roller carried on the outer end of one of said arms, a flexible drive element passing about said roller and connected with the adjacent end of the other arm, a rotary fluid motor attached to said base portion and having an output shaft, and a spiral drive member mounted on said output shaft and having said flexible element connected thereto whereby rotation of said fluid motor will cause opening or closing of said arms with the initial closing movement occurring rapidly and the final closing movement taking place more slowly, a valve carried by said base portion connected with the fluid motor, a valve shifter associated with the valve and extending toward said slide, and cam means carried by the slide adapted for engagement with said shifter before the slide reaches said arms when moved in the advancing direction in order to shift the valve to actuate the motor to cause opening of the arms so the slide can pass therebetween.

4. In a boring machine having a frame and a boring slide slidable along the frame and carrying a boring bar, steady rest means mounted on the frame for supporting the boring bar against lateral deflection, said steady rest means comprising a support frame mounted on the frame of the machine and having a platform portion thereon, a supporting base portion mounted on said platform, a pair of arms pivoted to said base portion adapted for closing about the boring bar in supporting relation thereto, spring means acting between the arms to urge them away from each other, an idler roller carried on the outer end of one of said arms, a flexible drive element passing about said roller and connected with the adjacent end of the other arm, a rotary fluid motor attached to said base portion and having an output shaft, and a spiral drive member mounted on said output shaft and having said flexible element connected thereto whereby rotation of said fluid motor will cause opening or closing of said arms with the initial closing movement occurring rapidly and the final closing movement taking place more slowly, a valve carried by said base portion connected with the fluid motor, a valve shifter associated with the valve and extending toward said slide, and cam means carried by the slide adapted for engagement with said shifter before the slide reaches said arms when moved in the advancing direction in order to shift the valve to actuate the motor to cause opening of the arms so the slide can pass therebetween, said platform comprising T-slot means extending longitudinally thereof and said base portion being attached to the platform by bolts extending into said T-slot means whereby the steady rest structure is adjustable longitudinally of the platform or can be detached therefrom.

5. In a steady rest structure of the nature described; a supporting base portion adapted for adjustable connection with the frame of a boring machine, said base portion having a transverse pivot shaft therein, a pair of arms mounted on said pivot shaft in intersecting relation, the said arms being arranged at one end for closing about a boring bar in supporting relation thereto, spring means biasing said arms to separate the one ends thereof, an idler roller carried on the other end of one of said arms, a flexible drive element passing around the roller and connected with the adjacent end of the other arm, a rotary fluid motor carried by the base portion having an output shaft, a spiral drive element mounted on said output shaft and said flexible element being connected thereto, a rotary valve also carried by the base portion and connected with the rotary fluid motor, a shifter connected with the valve member of said valve, for shifting the valve member in response to the movement of a cam element past the shifter, and supporting platform means for detachably and adjustably supporting the steady rest structure whereby the said structure can be used singly or in multiple or in any desired relative arrangement.

6. In a boring machine of the nature described having a frame with workpiece supporting means thereon and a boring slide slidable thereon and carrying a boring bar; a supporting surface on the frame parallel to the boring bar, a steady rest structure comprising a supporting base portion portion adapted for detachable mounting on said frame in adjusted positions along said supporting surface thereof, a pair of arms pivotally mounted on said base portion and having half bearings in their one ends, said arms being biased in opening direction to separate the said one ends thereof and being adapted for closing their said one ends about the said boring bar to bring said half bearings into supporting relation thereto, said half bearings comprising semi-cylindrical elements, a fluid motor carried by said base portion connected with said arms for moving them into their closed position, a valve also carried by the supporting base portion and connected for reversibly supplying fluid to said motor, and a cam member carried by said slide operable for actuating the valve during advancing movement of said slide for causing opening of said arms before the slide reaches the arms to permit the slide to pass therebetween, and said cam also being operable for actuating said valve during the retracting movement of said slide to cause the arms to close after the slide is retracted past the arms.

References Cited in the file of this patent

UNITED STATES PATENTS

| | | |
|---|---|---|
| 1,961,091 | Smith et al. | May 29, 1934 |
| 2,633,762 | Cudini | Apr. 7, 1953 |
| 2,795,977 | Carlstedt | June 18, 1957 |

FOREIGN PATENTS

| | | |
|---|---|---|
| 540,061 | Great Britain | Oct. 3, 1941 |